March 3, 1931.  B. E. GREEN  1,794,454
SEALING RING FOR ROTATING MACHINES OR CYLINDERS
Filed Sept. 8, 1928  2 Sheets-Sheet 1
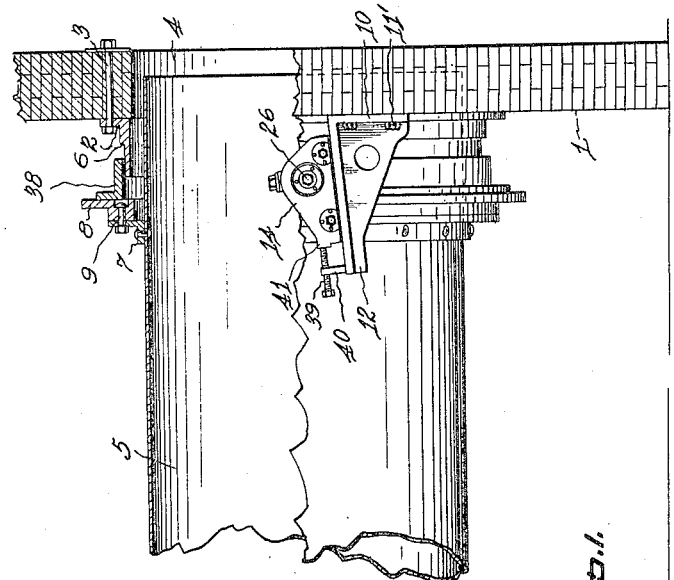
Fig.1.
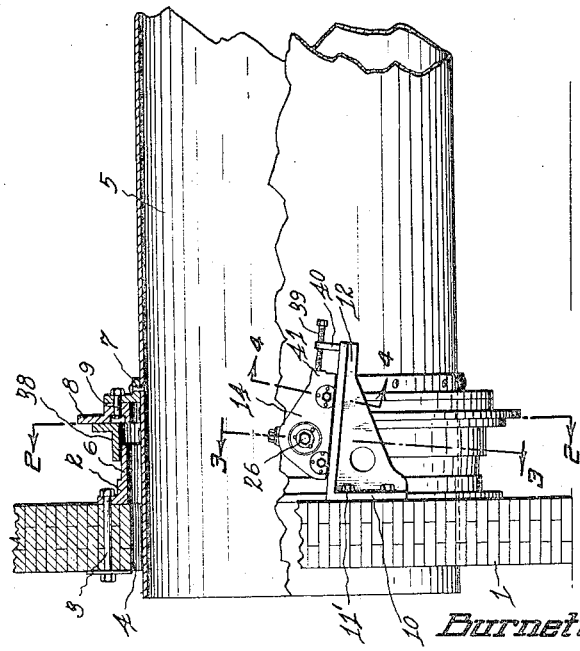
Inventor
*Burnett E. Green*
By 
Attorneys

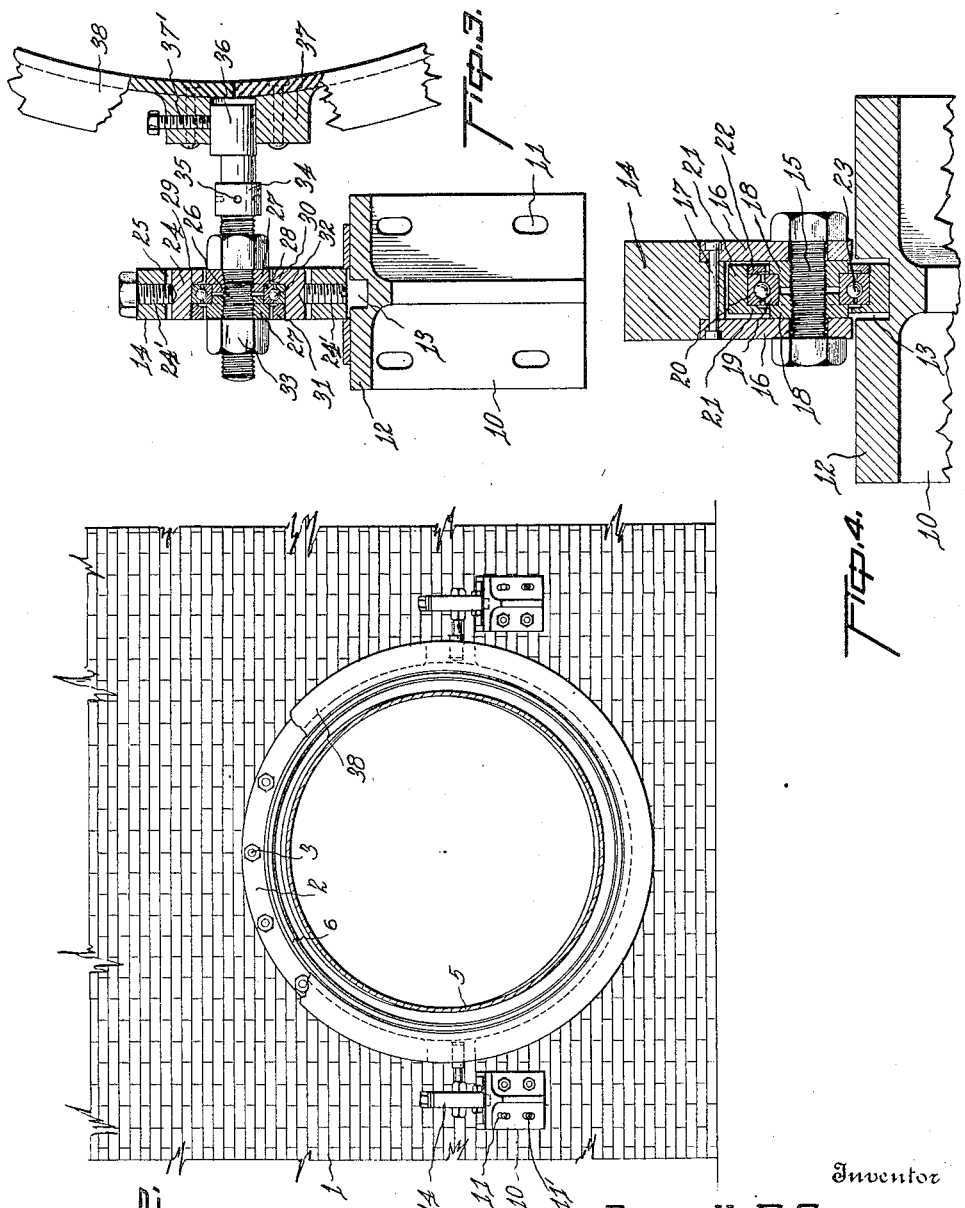

Patented Mar. 3, 1931

1,794,454

UNITED STATES PATENT OFFICE

BURNETT E. GREEN, OF ALPENA, MICHIGAN, ASSIGNOR TO HURON INDUSTRIES, INC., OF ALPENA, MICHIGAN, A CORPORATION OF MICHIGAN

SEALING RING FOR ROTATING MACHINES OR CYLINDERS

Application filed September 8, 1928. Serial No. 304,830.

The present invention pertains to a novel sealing ring, having special reference to that type of sealing ring employed for sealing heat in the various types of rotary kilns and rotary dryers.

One of the primary objects of the present invention is to provide a sealing ring which is equally applicable to either or both ends of a rotary kiln, that will effectively exclude all outside air from the kiln regardless of the state of the kiln as to expansion or contraction. The rings, constructed according to the present invention, when attached to the ends of a rotary kiln exclude all outside air at the work feeding end and admit a determined or regulated amount of air at the work discharge end. The rings in efficiently achieving these qualifications enable a degree of fuel economy to be reached in the rotary kiln industry, which heretofore never could be attained.

A further object of the present invention is to provide a sealing ring which is expressly designed to promote genuine economy, by surmounting the difficulties previously met in conserving the combustion gases at an even temperature and within the kiln. The conserving of the gases results in the possibility of employing the waste heat, resulting in a high degree of economy which was formerly impossible by reason of the inefficient sealing rings failing to exclude all outside air, or in failing to prevent the escape of the combustion gases from the interior of the kiln. The present device permits the combustion gases within the kiln to be successfully conserved at a maximum temperature, preventing the admission of outside air, and thereby permitting that the gases may be transferred to waste heat boilers to provide a power source for the plant.

A still further object of the present invention is to eliminate such common inconvenience as failure in operation through disorder in the parts, assuring a tremendous cut in operating and maintenance expenses by the employment of equipment which guarantees superior results and greatly improved manufacturing processes, in comparison to the sealing rings formerly used in the rotary kiln industry. Conventional means such as springs for adjusting the rings are entirely eliminated, the present structure being so built as to permit the use of gravity to supply the adjusting forces for the ring. The useful life of the ring is in this manner greatly prolonged by reason that there is no extreme pressure exerted upon the ring, this factor obviously preventing excessive wearing of the ring.

Another and still further object of the present invention is to provide a ring which can be applied to either or both ends of any rotary cylinder where excess free air should be excluded and give the maximum of efficiency. It is equally adaptable to a rotary dryer and provides an efficient means for excluding all outside air from the interior of the dryer and at the same time preventing the escape of any of the heated air from within the dryer. In efficiently sealing the rotary dryer, the fan causing circulation within the dryer is relieved of heavy duty, it being necessary when employing ordinary rings for the fan to do double duty to compensate for the leakages. The efficiency and economical conditions are therefore greatly improved and a degree reached which cannot be attained while employing rings which, through faulty performance, permit the entrance of outside air or the escape of the heated air from within and thereby preventing an even and proper temperature being maintained.

With these objects in view and others which will become apparent throughout the following disclosure, my invention is fully set forth by way of example in the following description, having reference to the accompanying drawings, in which—

Figure 1 is a side elevation of a rotary kiln equipped with the present invention, showing the device partly in section;

Fig. 2 is a cross section on the line 2—2 of Fig. 1;

Fig. 3 is a cross section on the line 3—3 of Fig. 1; and

Fig. 4 is a cross section on the line 4—4 of Fig. 1.

Similar characters of reference are employed throughout the following description and indicate the corresponding parts in the drawings, the numeral 1 designating furnace walls to which are attached wall plates 2, being supported by bolts 3 inserted in the mason work or concrete of the wall. The construction and assembly of the several parts is identical at both ends of the kiln and it will be necessary therefore that only one end shall be described in detail.

The wall plate 2 is circular in form and surrounds a circular opening 4 in the furnace wall, a rotary kiln 5 being conventionally suspended so as to have the end protruding into or through the opening 4. The wall plate 2 and the several parts to be further recited herein are constructed in halves and bolted together in the centre by steel plates, this construction permitting assembly and attachment of the equipment after the kiln has already been installed. The wall plate 2 is provided with an outwardly extending flange 6, the purpose of which will become apparent as the description progresses.

The cylindrical kiln 5 is provided with a ring 7 which is firmly secured to the kiln by rivets or bolts, the ring being L-shape in cross section. A joint ring 8 is secured to the ring 7 by bolts 9, the heads of which are sunk below the surface of the joint ring, the surface having a smooth machined face. The rings 7 and 8 are in this manner attached to the kiln and rotate therewith.

Brackets 10 are attached to the furnace wall adjacent the opening 4, having wall engaging portions 11 through which bolts 11' are passed to secure the brackets to the wall, the slots 11 permitting adjustment of the brackets vertically after the bolts 11' have been inserted through the wall 1. The brackets have extending portions 12 which project outwardly from the wall at an angle noticeably less than ninety degrees to the horizontal as may be observed in reference to Fig. 1 of the drawings. The extending portions 12 are provided with guide grooves 13 to accommodate the trolleys 14 which are carried by the brackets 10.

The trolleys are provided with the threaded shafts 15, carried by plates 16 secured in recesses adjacent each end of the trolley by the bolts or similar means 17. Nuts 18 are screwed upon the shafts 15 between the plates 16 and support a ball race 19, the opposite race 20 being secured within the wheel rim 21 by the inwardly projecting shoulder 21' and the nut 22 which is threaded within the wheel rim 21. Ball bearings 23 are inserted in the races 19 and 20 and permit a practically frictionless movement of the wheels 21 which are received and guided in the grooves 13 in the portions 12 of the brackets 10.

Ball race supporting rings 24 are fulcrumed within the circular openings 25 in the trolleys 14 by means of the fulcrum screws 24', a threaded stub shaft 26 being retained in each trolley by the nuts 27, which support a ball race 28, the opposite race being held within the ring by the inwardly extending annular flange 30 and the nut 31 which is screwed into the ring. Ball bearings 32 are inserted in the races 28 and 29 and permit a practically frictionless rotation of the stub shaft 26 within the fulcrumed ring 24. The stub shafts are locked within the rings 24 by the lock nuts 33 and have the outwardly extending ends formed with cylindrical nuts 34 having radially drilled holes 35 to accommodate a pin type of wrench for rotating the stub shaft. The outward ends of the stub shafts are provided with eccentric journals 36 which are received in bearings 37 provided upon the sealing rings 38 which are L-shape in cross section. A set screw 37' is provided in each bearing 37 to lock the eccentric in any desired position. An adjustment means for the trolley 14 is provided by the set screw 39 in the post 40 on the portion 12 of the bracket 10, the set screw butting against the shoulder 41 on the trolley 14.

From the above description it is obvious that the sealing ring 38 is supported upon the stub shafts 26 in such manner that the face of it contacts with the joint ring 8, being L-shape in cross section, the sealing ring 38 also surrounds the annular flange 6 on the wall plate 2. A slight clearance is provided between the flange 6 and the sealing ring 38, the nature of which forms an air trap which from actual test has proven that no air escapes through this opening.

It is apparent that the ring is movable vertically by means of the eccentric 36, it may be swivelled on a horizontal plane by the fulcrums 26 and is movable longitudinally in relation to the kiln by the trolleys on the brackets 10, and movable at right angles to the axis of the kiln by the threaded stub shafts 26 and the nuts 33. The ring is therefore movable by means of this universal connection along a plane parallel to the axis of the kiln for purposes of adjustment in any desired direction. The brackets being slightly inclined cause the trolleys to move by force of gravity until the face of the sealing ring rests normally in contact with the face of the joint ring. Excessive pressure cannot be brought to bear upon the sealing ring and there is therefore no undue wear caused by the frictional engagement of the rings, thereby promoting economy by increasing the useful life of the sealing ring.

Expansion of the kiln is compensated for by the movement of the trolley, this movement being caused by gravity is entirely automatic and requires no personal attention, contraction due to a lowering of temperature in the kiln does not draw the rings together more tightly as happens in ordinary structures, but on the contrary the same pressure is at all times acting upon the sealing ring, regardless of the state of expansion or contraction of the kiln. Should it be desired, however, to admit a determined quantity of air into the kiln, the set screw 39 is employed to adjust the trolleys in a position where they support the sealing ring spaced from the joint ring and thereby permit the entrance of air.

A specific embodiment of my invention has been illustrated and described, but it is to be understood that various alterations may be made in the details of construction without departing from the spirit of the invention as depicted in the following claims.

What I claim is:—

1. A sealing ring for a rotating cylinder comprising in combination a stationary member, a circular flanged wall plate attached to said stationary member, a rotating cylinder extending through said stationary member and surrounded by said flanged wall plate, a joint ring carried by said rotating cylinder, a sealing ring supported from said stationary member and means for maintaining said sealing ring in contact with said joint ring, said means consisting of inclined brackets carried by said stationary member, trolleys movable by force of gravity on said brackets, and pivotal connections between said trolleys and said sealing ring whereby said sealing ring may be adjusted to a position with its axis parallel to the axis of said rotating cylinder.

2. A sealing ring for a rotating cylinder comprising in combination a stationary member, a rotating cylinder, a joint ring attached to said rotating cylinder, a sealing ring, trolleys for supporting said sealing ring, and means carried by said stationary member for supporting said trolleys, and a pivotal connection between said trolleys and said sealing ring.

3. Adjustable rotary-kiln sealing means comprising a stationary flanged two-part ring-type wall plate having a projecting tubular sleeve through which one end of the cylindrical rotating member of a rotary dryer kiln concentrically projects, said wall plate being fixedly attached to an inclined circularly-pierced wall positioned approximately at right angles to the axis of the rotating dryer or kiln member to which is fixedly attached a flanged two-part ring for supporting the joint ring, against which the force of gravity holds a flanged sealing ring having a projecting tubular sleeve that concentrically surrounds but does not touch the tubular sleeve projecting from the wall plate, said sealing ring being pivotally supported by stub shafts passing through anti-friction bearings mounted in trolley-like supporting members moving lengthwise of the kiln on a track forming part of the stationary member of a support bracket provided with an adjustable stop screw adapted to hold the sealing ring out of contact with the joint ring and thus regulate the amount of air flowing therebetween.

4. In a sealing device for rotary kilns, means for automatically offsetting expansion and contraction stresses that tend to impair the seal and for maintaining uniformity of contacting pressure between the stationary sealing and moving joint rings, said means comprising in combination an automatically movable rolling type of sealing-ring support, a non-rotating sealing ring so disposed as to utilize the force of gravity in keeping it in contact with a rotating joint ring attached to a flanged ring on the rotating shell of the kiln, said sealing ring being adjustably mounted on stub shafts having eccentrically turned ends for moving the ring vertically, said stub shafts passing through pivotally mounted bearings carried by a trolley-type support movable on ball-bearing rollers or wheels rolling on a track forming part of a supporting bracket attached to the same wall as the two-part ring-shaped wall plate through which projects the rotating end of the kiln, substantially as shown and described.

5. A sealing ring mechanism embodying means for automatically eliminating expansion and contraction stresses thereon and for maintaining uniformity of contacting pressure between sealing and joint rings, said means comprising a slidable type of sealing-ring support and positional dispositioning of the sealing ring such as to make use of the force of gravity in keeping it in contact with the joint ring, vertical adjustment of sealing ring being provided by mounting sealing ring on rotatable stub shafts having eccentrically turned ends, said stub shafts passing through bearings pivotally mounted in the slidable member of the sealing ring support, said slidable member being provided with an adjustable stop screw adapted to hold the sealing ring out of contact with the joint ring so as to regulate the flow of air therebetween whenever its admission is desired, said bearings and pivotal mounting thereof providing for simultaneous movement in two directions, thereby compensating for "weaving" due to distortion of the rotating kiln to which is attached the joint ring against which the sealing ring bears and slides with uniform pressure, substantially as shown and described.

6. A rotary kiln sealing ring adapted to prevent entrance of air at the feed end and to regulate the intake of air at the discharge end of the kiln and comprising, in combination with the cylindrical rotating member or shell of the kiln, a two-part flanged ring externally attached thereto for supporting a two-part concentrically arranged joint ring having a flat machined face against which the similarly machined flange of a two-part sealing ring is normally held in contact by the force of gravity said sealing ring being supported on stub shafts having eccentrically turned ends to provide for vertical adjustment of the ring, said stub shafts passing through pivotally mounted bearings in a slidable trolley-like member adapted to move back and forth lengthwise of the kiln on ball-bearing rollers running on a track in the wall bracket that, through the trolley member and stub shafts, supports the sealing ring and eliminates binding by crosswise movement of the kiln, which projects through a circular two-part ring-type wall plate having a tubular sleeve-like extension concentric with and surrounding the shell of the kiln and projecting into the sealing ring with which it is concentrically aligned but does not touch, substantially as shown and described.

7. Rotary kiln sealing mechanism comprising in combination a flanged two-part ring-shaped wall plate for attachment to a coaxially pierced masonry wall, a flanged two-part ring-shaped support fixedly attached to the outside of shell of kiln, a joint ring attached to said supporting ring and moving with it, a flanged two-part ring-shaped sealing ring intermediate the wall plate and joint ring, said sealing-ring flange face making gravity-controlled contact with correspondingly machined face of the joint ring, said sealing ring having an integral tubular cylindrical sleeve projecting outwardly from the sealing ring flange and concentrically surrounding a similarly projecting cylindrical tubular coaxially-disposed sleeve forming an integral part of the co-axially aligned wall plate, a sealing-ring support adapted to provide compensatory movement lengthwise of the kiln in harmony with and corresponding to that due to expansion and contraction of the kiln, said support embracing two wall brackets provided with adjustable means for holding the sealing ring out of contact with and in spaced relation to the joint ring, thereby controlling the admission of air therebetween, said wall brackets having tracks on which move back and forth ball-bearing rollers mounted in and carrying trolley-like members having pivotally-mounted bearings through which pass stub-shaft ring-supporting trunnions having eccentrically turned ends that enter suitably recessed supporting blocks attached to the sealing ring, thereby providing adjustable means for raising and lowering the sealing ring, the trunnion shafts being held securely in non-shiftable position at one end by set screws and at the other end by clamping nuts, one on each side of each trunnion shaft bearing, substantially as shown and described.

In testimony whereof I affix my signature.

BURNETT E. GREEN.